(12) United States Patent
Malinie

(10) Patent No.: US 6,793,453 B2
(45) Date of Patent: Sep. 21, 2004

(54) METHOD AND DEVICE FOR TRANSPORTING AND TURNING OBJECTS

(75) Inventor: Robert Malinie, Bouc Bel Air (FR)

(73) Assignee: Elpatronic AG, Bergdietikon (CH)

( * ) Notice: Subject to any disclaimer, the term of this patent is extended or adjusted under 35 U.S.C. 154(b) by 14 days.

(21) Appl. No.: 10/311,560

(22) PCT Filed: Jun. 18, 2001

(86) PCT No.: PCT/CH01/00379

§ 371 (c)(1), (2), (4) Date: Dec. 16, 2002

(87) PCT Pub. No.: WO02/04325

PCT Pub. Date: Jan. 17, 2002

(65) Prior Publication Data

US 2003/0136639 A1 Jul. 24, 2003

(30) Foreign Application Priority Data

Jul. 7, 2000 (CH) .............................................. 1352/00

(51) Int. Cl.[7] ...................... B65G 47/248; B65G 25/02; B23Q 7/16
(52) U.S. Cl. ...................................... 414/758; 198/402
(58) Field of Search ................................ 198/402, 403; 414/758, 759, 764, 765, 767, 773

(56) References Cited

U.S. PATENT DOCUMENTS

| | | | | |
|---|---|---|---|---|
| 2,207,590 A | * | 7/1940 | Lagaard | 99/405 |
| 2,485,373 A | * | 10/1949 | Farrell | 53/140 |
| 3,176,825 A | * | 4/1965 | Heinz et al. | 198/402 |
| 3,595,251 A | * | 7/1971 | Tarantola | 134/65 |
| 3,785,473 A | * | 1/1974 | Cook | 198/402 |
| 3,868,101 A | * | 2/1975 | Nozaki et al. | 269/25 |
| 4,104,080 A | * | 8/1978 | Sadwith | 134/23 |
| 4,452,350 A | * | 6/1984 | Shields | 198/418.6 |
| 4,703,859 A | * | 11/1987 | Pynsky | 209/597 |
| 4,771,589 A | * | 9/1988 | Mueller et al. | 53/446 |
| 5,971,695 A | * | 10/1999 | Batzer et al. | 414/765 |
| 6,190,111 B1 | * | 2/2001 | Nuhlicek et al. | 414/405 |
| 6,371,277 B1 | * | 4/2002 | Malinie | 198/463.3 |

FOREIGN PATENT DOCUMENTS

| | | |
|---|---|---|
| GB | 2 142 309 A | 1/1985 |
| WO | WO/99 39849 | 8/1999 |

* cited by examiner

*Primary Examiner*—Douglas Hess
(74) *Attorney, Agent, or Firm*—McCormick, Paulding & Huber LLP

(57) ABSTRACT

On a processing apparatus with step-by-step conveying of the articles to be processed and a turning module for the articles, turning is performed transversely with respect to the conveying direction. This allows much space to be saved in the turning arrangement.

11 Claims, 4 Drawing Sheets

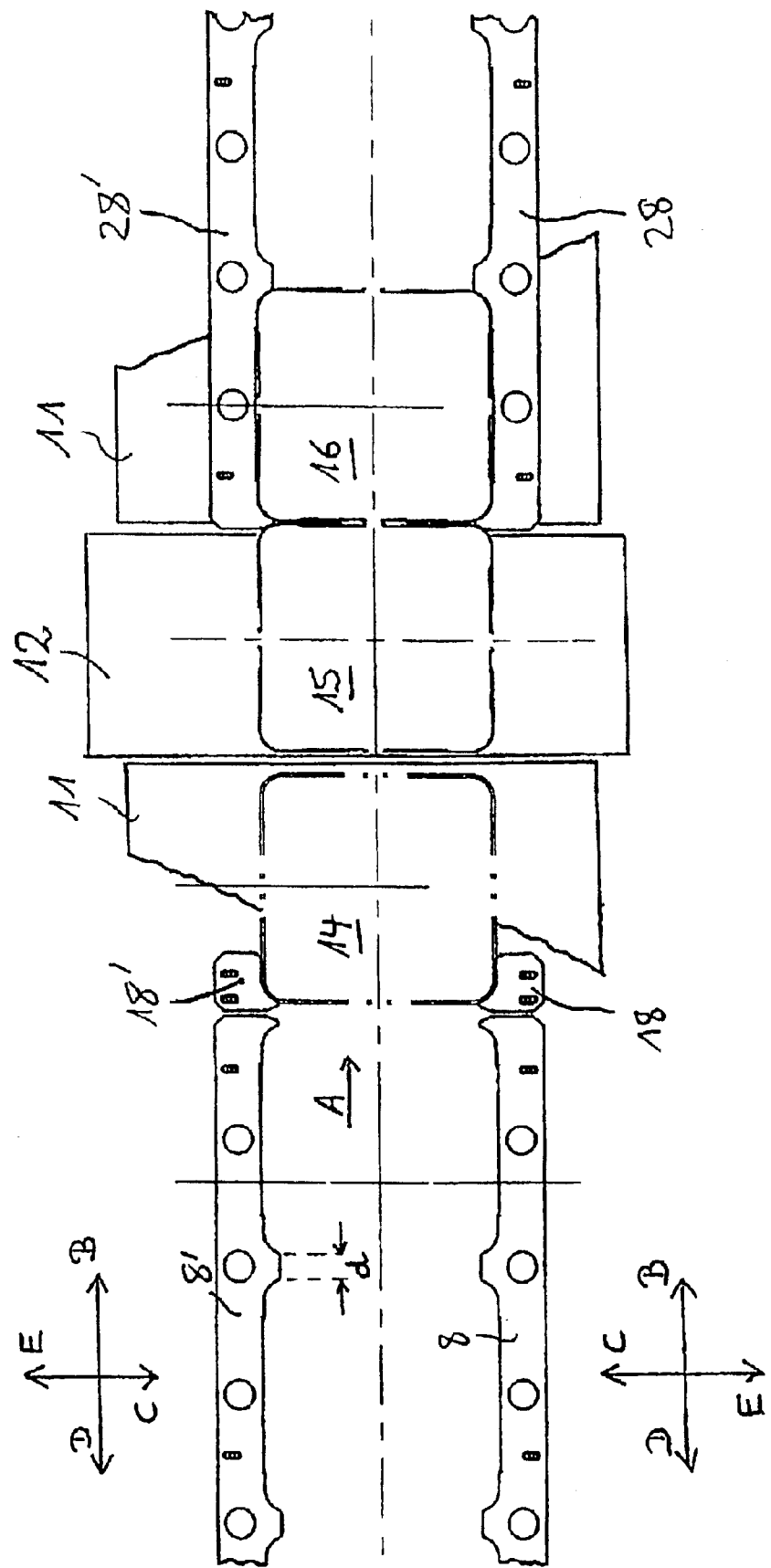

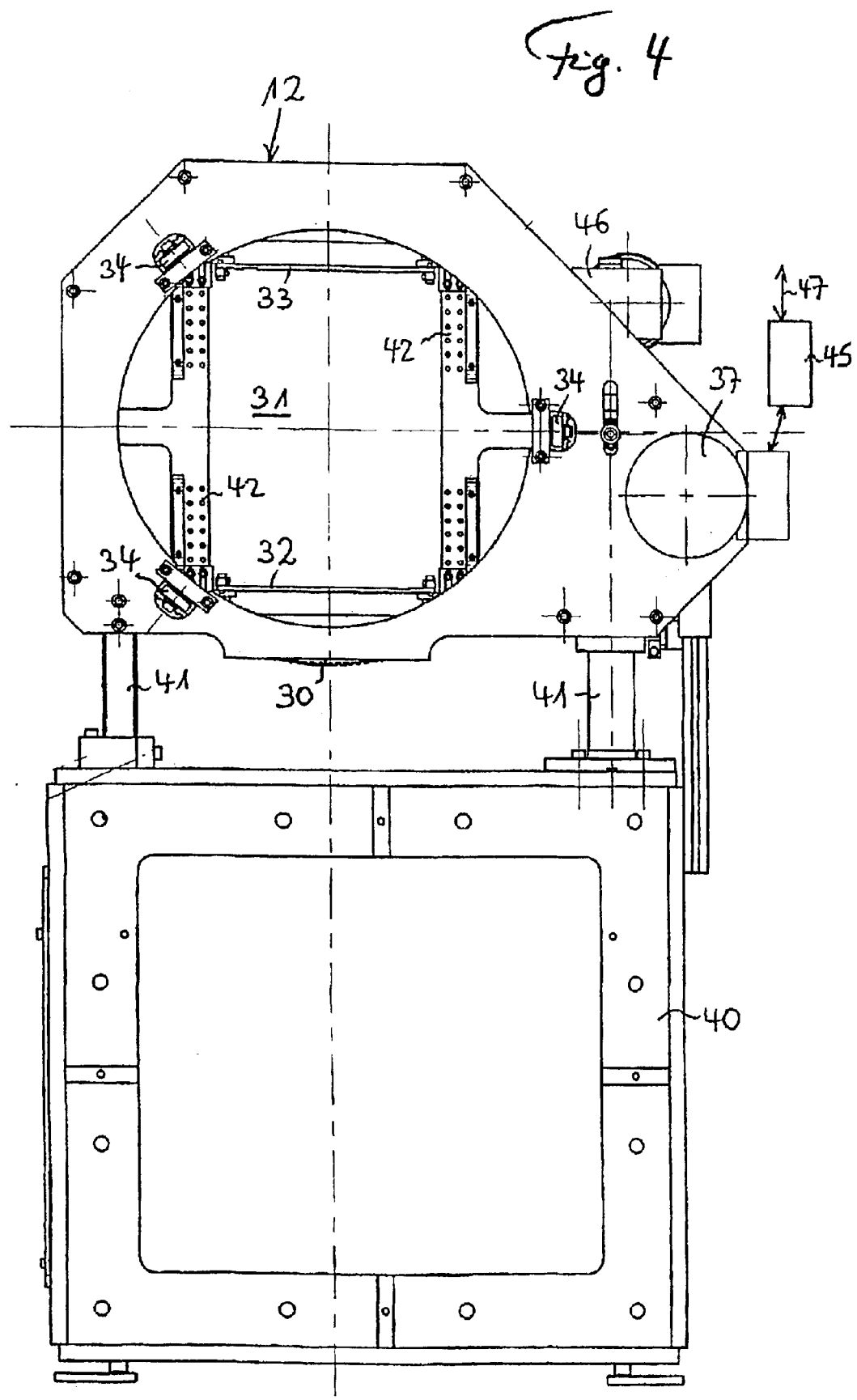

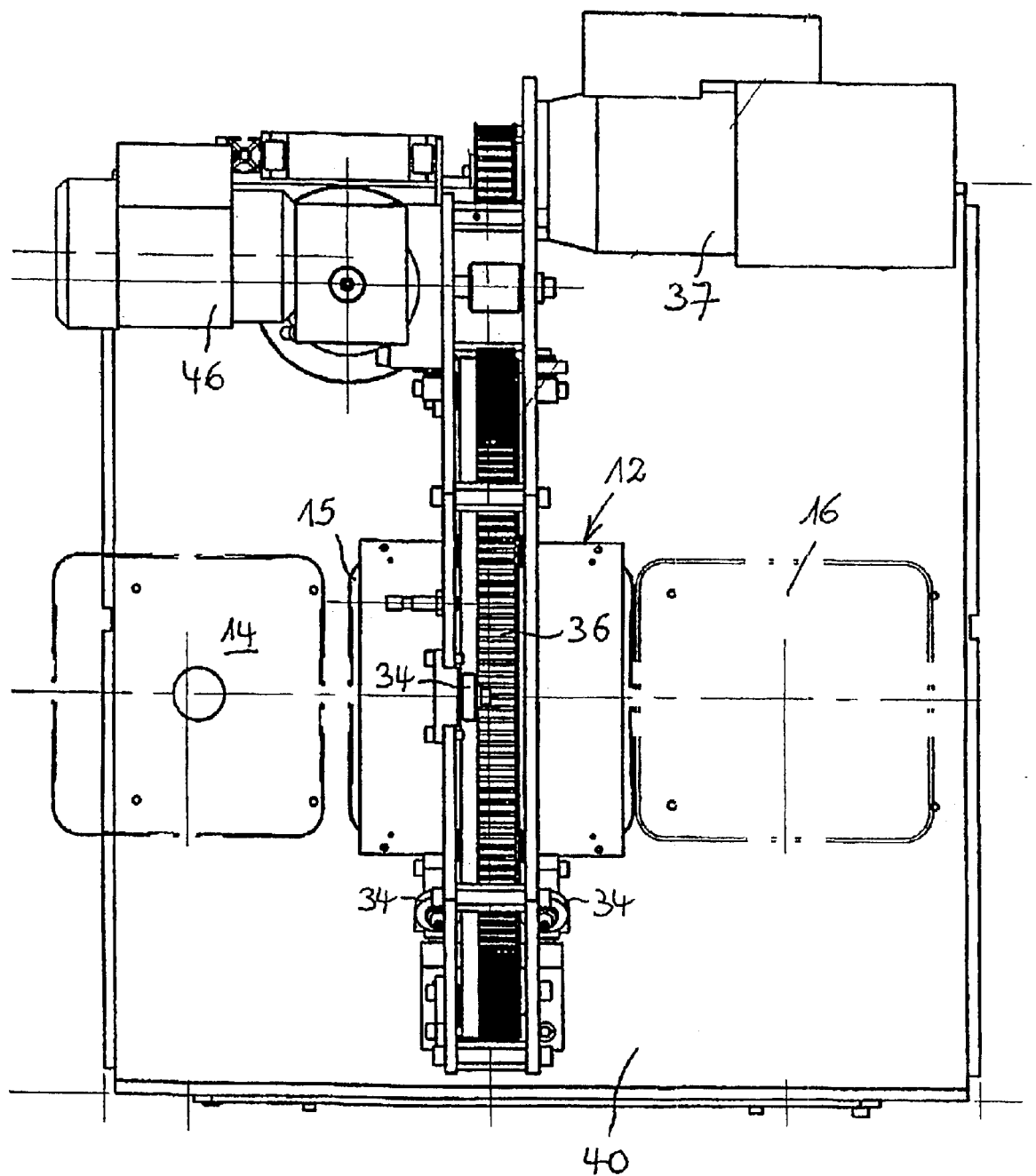

METHOD AND DEVICE FOR TRANSPORTING AND TURNING OBJECTS

The invention relates to a method for step-by-step conveying according to the introductory part of Claim 1, an apparatus for step-by-step conveying according to the introductory part of Claim 8, and a turning module according to the introductory part of Claim 11.

An apparatus for step-by-step conveying of containers is known from WO99/39849. It has bars arranged alongside the containers and provided with pushers which, by a converging movement of the bars, take hold of the containers (which are standing in line, spaced apart, on a conveyor plate), advance the containers one step in the conveying direction by a forwards movement of the bars, let go of the containers by a diverging movement of the bars, and then by a one step backwards movement of the bars revert to the pick-up position, where the process repeats itself. As the container bodies in this example are being conveyed in a machine line of modular construction to processing modules which intervene in the bodies from above, the bodies, after being conveyed a certain distance, are turned over so that their other end (which is the bottom end, if the containers have been fed into the sequence of processing stations top end up first) can be processed in processing modules downstream of the turning module. The turning module has a beam pivotable about an axis transverse with respect to the conveying direction, on which beam the container is held magnetically. The beam turns the container over in the conveying direction and places the overturned container on a conveyor plate, where it is seized by the bars of the next step-by-step conveyor. This conventional way of turning the container bodies takes up a lot of room in the conveying direction, particularly for tall containers.

Therefore the basic problem which the invention seeks to solve is to provide a method and an apparatus, and also a turning module, which do not have these disadvantages.

In the case of the method stated at the outset this problem is solved by the characterizing features of Claim 1, and in the case of the apparatus of the kind stated at the outset, by the characterizing features of Claim 8. In the case of a turning module of the kind stated at the outset the problem is solved by the characterizing features of Claim 11.

Rotating transversely across the conveyor path, and especially rotating "on the spot" without displacement in the conveying direction, means that the length needed in the conveying direction for the turning operation becomes independent of the height of the article.

It is especially preferred that conveying should cease to be in spaced-apart mode in the turning zone, and give way to a conveying mode in which the article entering the turning zone pushes the overturned article out of the turning zone. The article can then be picked up again by a step-by-step conveyor and conveyed to the subsequent processing stations. Through this preferred transition from spaced-apart conveying to direct-contact conveying in the turning zone, much space can be saved in the design of the turning zone.

This and further preferred examples of ways of carrying out the invention will now be described in detail with reference to the drawings, in which:

FIG. 2 shows schematically three step-by-step conveyors with a turning zone according to the invention in between them, viewed from above;

FIG. 4 shows a turning module with a turning unit according to FIG. 2; and

FIG. 5 shows the turning module of FIG. 3 viewed from above.

Figure 1:
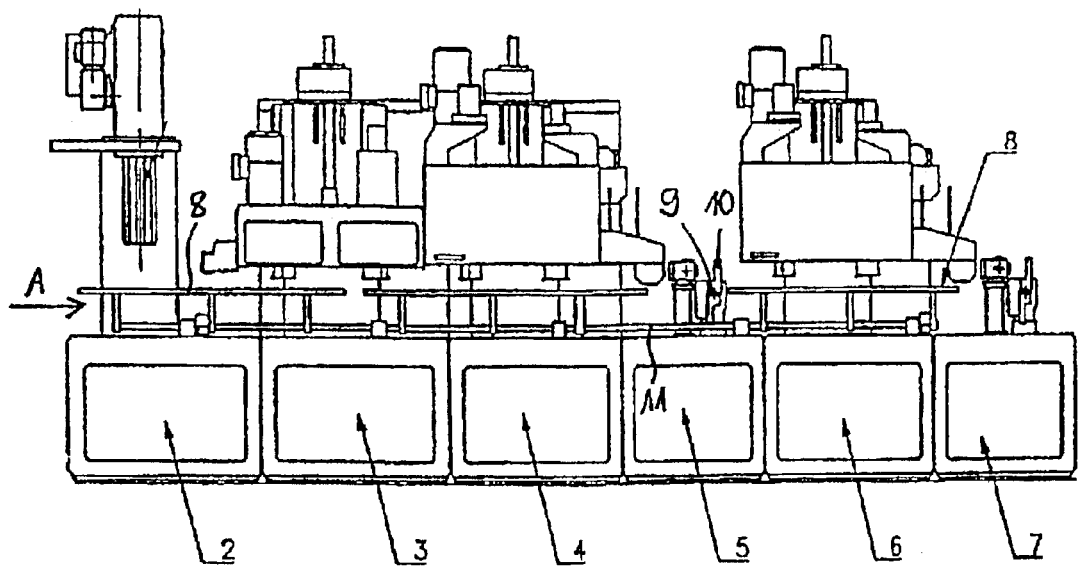
FIG. 1 shows a view of a processing installation with turning modules according to the state of the art.

FIG. 1 shows the processing installation known from WO99/39849, with a plurality of processing modules 2, 3, 4 and 6 and with turning modules 5 and 7, intended for the processing of containers. For example, the processing module 2 may be a tapering module, the processing module 3, a module for edging and crimping, and the module 4, a processing module for forming an outwards-projecting flange and a rim bead. The turning module 5 turns the part-processed article or container over, i.e. places it upside down. In the processing module 6 the overturned container is provided with a flange and prepared rim and is fitted with a bottom. The container can be placed top end up again in a further turning module. State of the art turning modules have a turning beam 10 pivotable in the conveying direction A about an axis 9 transverse thereto, on which beam one container at a time is held magnetically and then tipped over in the conveying direction so that its top end goes down on to the conveyor plate 11 and its bottom end is turned upwards. It is obvious that if the containers are tall, a large amount of room is needed for this overturning to take place. For spaced-apart conveying of the individual containers to the processing stations, use is made of step-by-step conveyors with bars 8 which, in each case, take hold of the containers and advance them one step at a time in the conveying direction. FIG. 2 shows schematically a top view of such bars and three containers where the containers are turned over in the transverse direction in accordance with the invention. In FIG. 2 the turning unit is merely schematically indicated at 12 and will be described in detail later. The bars 8 and 8' of one step-by-step conveyor and the bars 18 and 18' of the further step-by-step conveyor and 28 and 28' of the step-by-step conveyor located after the turning unit in each case execute a movement cycle known in itself, which will be explained with reference to the arrows in FIG. 2. In each case the bars execute a converging movement in the arrow-direction C, thus taking hold of the articles. The articles are spaced apart from each other by a distance d imposed by the design of the pushers on the bars. FIG. 2 shows how the containers 14 and 16 have been taken hold of in this way by the bars 18/18' and 28/28', respectively. Containers are of course also present in the other holder positions of the bars, but are not shown here. After this converging and seizing step, the bars execute a movement in the direction of the arrow B, which shifts the container concerned one step forwards in the conveying direction A. The bars then move in the direction of the arrows E, releasing the containers, which are left standing in position on the respective holding plates 11. The bars then move one step back again in the direction of the arrows D, and, by moving in the direction of the arrows C, seize another container in each pair of jaws, which is then again advanced in the direction of the arrows B. This movement cycle is repeated after processing of the containers in each station has been completed.

Figure 3:
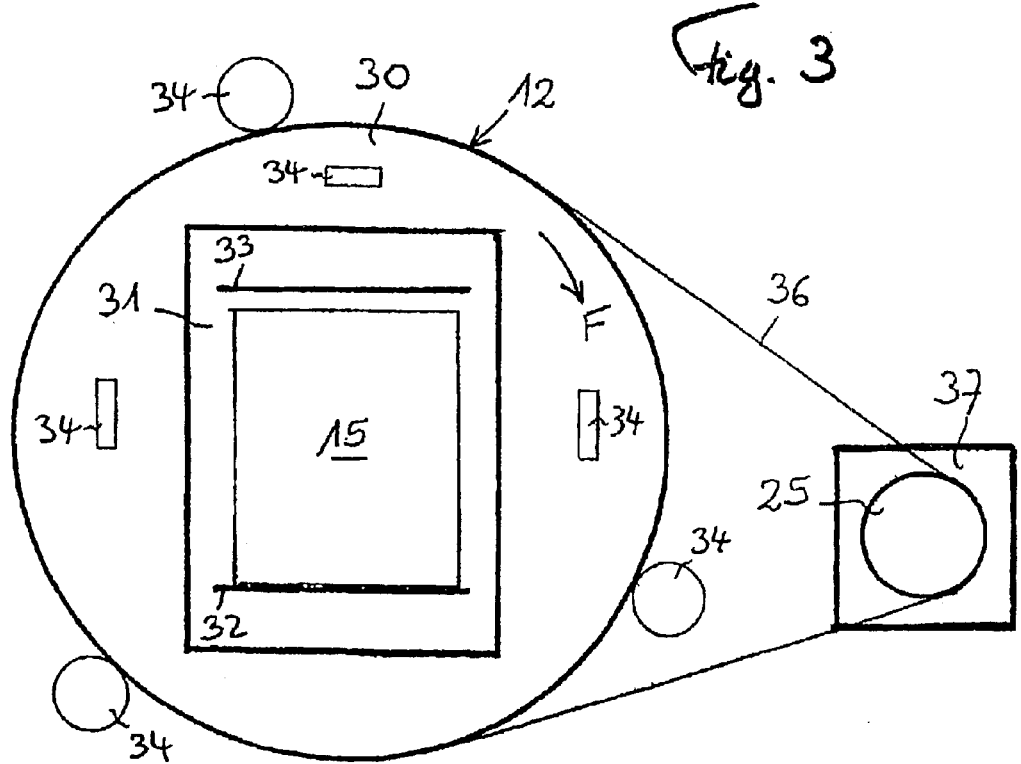
FIG. 3 is a highly schematic front view of a turning unit.

In accordance with the invention, the containers are then individually turned through 180° transversely across the conveying direction A in the turning unit 12, so that a container initially entering the turning unit top end up, for example, stands bottom up in the turning unit 12 after the turning operation has taken place. FIG. 3 shows schematically a view of such a turning unit according to the invention, viewed for example in the opposite direction to the conveying direction A, i.e. viewed from container 16 of FIG. 2. The container 15 is standing in the turning unit. The turning unit has a gear ring 30 (whose teeth are not shown in FIG. 3) which has a slot 31 for the container. The container stands in this slot on a holding plate 32, and a plate 33 is preferably arranged above the container. The container may be held on the holding plate 32 e.g. by weak magnetic attraction. The gear ring 30 is held by guide means 34 which are only schematically indicated in FIG. 3, so as to be rotatable about its centre and it is moreover held in a frame (not shown) so that the holding plate 32 is in flush alignment with the holding plates 11 of the step-by-step conveyors so that the container can be conveyed from the step-by-step conveyors into the slot 31 in the gear ring 30. The gear ring 30 can be turned in the direction of the arrow F by means of a motor 37 via a pinion 35 and a toothed belt 36, to turn the container 15. Either the container 15 then stands on the holding plate 33, which is now located underneath, and which, following the rotation, is likewise flush with the holding plates 11; or the container is suspended from the holding plate 32, on which it is still held magnetically. In either case, the container is then pushed or pulled clear of the slot in the gear ring, as described below, and the next container (container 14 in the example) enters the turning unit 12. Thus, the article has been turned on the spot, transversely with respect to the conveying direction, and without displacement in the conveying direction, by the turning unit 12.

If the slot 31 in the gear ring is made sufficiently large at either side, the step-by-step conveyor located in front of the gear ring 30 in the conveying direction can convey the container into the slot 31, leave the container standing there, and withdraw, before turning takes place. The downstream step-by-step conveyor 28, 28' can then remove the container concerned from the turning unit by reaching into the turning unit as it performs its backwards movement. However, a preferred mode of operation, which can best be explained by reference to FIG. 2, is one in which the step-by-step conveyor consists only of short bars 18 and 18' and as it performs its step in the direction B, pushes the container 14 placed in front of the turning unit 12 into the slot 31, causing the container 14 to make contact with the container 15 and bump the latter out of the turning unit 12 so that it then occupies the position of the container 16 shown in FIG. 2, where it is clear of the turning unit 12 and is held by the step-by-step conveyor 28, 28'. Hence in performing its step in the direction B, the step-by-step conveyor 18, 18' conveys both the container 14 and—indirectly by means of the container 14—the container 15 in the turning unit 12. The distance d between containers therefore disappears in the turning unit 12, which also helps to reduce the amount of space needed for the turning operation. In this case, the slot 31 can be made narrower, as the bars of the step-by-step conveyors 18/18' and 28/28' do not need to fit into the slot at all; in the case of the bars 18 and 18', this is as a consequence of their being shortened. FIG. 4 shows a more accurate view of the turning unit constructed as a turning module with a frame 40 on which the gear ring 30, located behind a casing, is arranged on columns 41 with provision for vertical adjustment which may for example be made by a drive 46 to adjust the height of the holding plates 32 and (after turning) 33 to the height of the holding plates 11 of the step-by-step conveyors. The holding plates 32 and 33 are also made adjustable in relation to one another for adaptation to different container heights, e.g. by mounting them on perforated plates 42, or by other arrangements. The guide rollers 34 for the gear ring and the drive motor 37 can also be seen in the figure. A control unit 45, merely shown schematically, controls the motor upon each turn of the slot 31 through 180°. The control unit 45 may be given the instruction to perform each turn by a higher-ranking machine control via a signal line 47. The control unit 45 can of course be omitted if the turning instruction is given directly to the turning unit 12 by the higher-ranking control.

FIG. 5 shows the turning unit 12 constructed as a module as seen from above, with three containers shown in outline. Reference numbers denote the same elements as before.

What is claimed is:

1. Method for step-by-step conveying of articles spaced apart from one another along a series of stations including turning of the articles between stations, characterized in that turning takes place transversely with respect to the conveying direction; and characterized in that conveying is effected by a step-by-step conveyor means which executes a forwards movement and a backwards movement, the turned article being bumped out of the turning zone by the next article pushed into the turning zone upon the forwards movement of the step-by-step conveyor means.

2. Method according to claim 1, characterized in that the article bumped out of the turning zone is seized by an ensuing step-by-step conveyor means.

3. Method for step-by-step conveying of articles spaced apart from one another along a series of stations including turning of the articles between stations, characterized in that turning takes place transversely with respect to the conveying direction; and characterized in that conveying is effected by a step-by-step conveyor means which executes a forwards movement and a backwards movement, a first step-by-step conveyor means placing the article on a holding plate in the turning zone and then executing its backwards movement, turning thereupon being performed transversely with respect to the conveying direction, and a second step-by-step conveyor means then seizing the turned article within the turning zone.

4. A method for conveying containers, comprising the steps of:

providing a first processing module, a second processing module, and a turning module disposed between the first processing module and the second processing module, wherein containers conveyed from the first module to the second module follow a conveying direction;

processing a first end of each container in the first processing module, wherein each container is positioned in a first orientation in the first processing module;

first conveying each container from the first processing module to the turning module;

turning each container within the turning module from the first orientation to a second orientation that is substantially 180° from the first orientation, wherein the turning takes place transversely with respect to the conveying direction;

second conveying each container from the turning module to the second processing module; and processing a second end of each container in the second processing module;

wherein in the first conveying step, a conveyor means executes a forward movement and a backward movement, wherein after a container is turned within the turning module, the turned container is conveyed out of the turning module by another container being conveyed into the turning module by the forward movement of the conveyor means.

5. The method of claim 4, wherein the container conveyed out of the turning module is seized by a second conveyor means.

6. An apparatus for step-by-step conveying of containers that are spaced apart from one another, comprising:
   a first processing module;
   a second processing module;
   a turning module, disposed between the first processing module and the second processing module;
   wherein the first processing module, second processing module, and the turning module are relatively positioned so that containers travel in a conveying direction that extends from the first processing module, through the turning module, to the second processing module;
   wherein the turning module is operable to selectively turn the containers from a first orientation to a second orientation that is 180° from the first orientation, and the containers are turned in a direction that is transverse to the conveying direction; and
   a means for conveying the containers through the apparatus, the means for conveying being disposed upstream of the turning module; and
   wherein the means for conveying the containers is operable to cause a first container disposed within the turning module to be pushed out of the turning module by a second container being pushed into the turning module.

7. The apparatus of claim 6, wherein the turning module comprises a slot disposed between a pair of holding plates separated from one by a clearance distance, and wherein the clearance distance between the holding plates is adjustable.

8. The apparatus of claim 7, wherein one or both of the holding plates is positionally adjustable.

9. The apparatus of claim 7, wherein the turning module further comprises a gear ring rotatably driven by a drive means, and the holding plates are attached to the gear ring.

10. A method for conveying containers, comprising the steps of:
    providing a first processing module, a second processing module, and a turning module disposed between the first processing module and the second processing module, wherein containers conveyed from the first module to the second module follow a conveying direction, wherein each container is positioned in a first orientation in the first processing module;
    pushing a first container toward the turning module and into contact with a second container disposed within the turning module, and pushing the second container out of the turning module; and
    turning the first container within the turning module from the first orientation to a second orientation that is substantially 180° from the first orientation, wherein the turning takes place transversely with respect to the conveying direction.

11. An apparatus for step-by-step conveying of containers in a conveying direction, comprising:
    a turning module that is operable to selectively turn the containers from a first orientation to a second orientation that is 180° from the first orientation, and the containers are turned in a direction that is transverse to the conveying direction; and
    a means for conveying the containers through the apparatus, the means being disposed upstream of the turning module, and
    wherein the means for conveying the containers is operable to cause a first container disposed within the turning module to be pushed out of the turning module by a second container being pushed into the turning module.

* * * * *

UNITED STATES PATENT AND TRADEMARK OFFICE
CERTIFICATE OF CORRECTION

| | | |
|---|---|---|
| PATENT NO. | : 6,793,453 B2 | Page 1 of 1 |
| APPLICATION NO. | : 10/311560 | |
| DATED | : September 21, 2004 | |
| INVENTOR(S) | : Robert Malinie | |

It is certified that error appears in the above-identified patent and that said Letters Patent is hereby corrected as shown below:

Column 5, line 31, please insert the word --another-- after "one".

Signed and Sealed this

Eighth Day of January, 2008

JON W. DUDAS
*Director of the United States Patent and Trademark Office*